United States Patent [19]

Moore

[11] Patent Number: 4,572,826

[45] Date of Patent: Feb. 25, 1986

[54] TWO STAGE PROCESS FOR HCN REMOVAL FROM GASEOUS STREAMS

[75] Inventor: George R. Moore, Houston, Tex.

[73] Assignee: Shell Oil Company, Houston, Tex.

[21] Appl. No.: 685,708

[22] Filed: Dec. 24, 1984

[51] Int. Cl.[4] ................................................. C01C 3/00
[52] U.S. Cl. ..................................................... 423/236
[58] Field of Search ................................. 423/236, 237

[56] References Cited

U.S. PATENT DOCUMENTS

| | | | |
|---|---|---|---|
| 1,924,206 | 8/1933 | Hansen | 423/236 |
| 2,859,090 | 11/1958 | Karchmer et al. | 423/236 |
| 4,497,784 | 2/1985 | Diaz | 423/236 |

FOREIGN PATENT DOCUMENTS 873609  7/1961  United Kingdom ................ 423/236

Primary Examiner—Gregory A. Heller
Attorney, Agent, or Firm—Albert J. Adamcik

[57] ABSTRACT

HCN is removed from a gaseous stream, e.g., a synthesis gas stream, by a two stage procedure in which the gaseous stream is first contacted with a specified oxygenated reactant composition to remove the bulk of the HCN, and then the gaseous stream is contacted with a polysulfide solution to reduce further the HCN content of the stream.

8 Claims, No Drawings

TWO STAGE PROCESS FOR HCN REMOVAL FROM GASEOUS STREAMS

BACKGROUND OF THE INVENTION

The presence of hydrogen cyanide (HCN) in various gaseous streams complicates removal of additional impurities, e.g., removal of $H_2S$ or $CO_2$, and poses problems insofar as product quality and pollution control requirements are concerned. In particular, gas streams derived from the gasification of coal generally have significant minor quantities of HCN which must be dealt with before the gas is utilized.

Accordingly, a practical and efficient procedure for removing impurity HCN might have great economic importance. The invention is such a process.

SUMMARY OF THE INVENTION

The invention, therefore, relates to a process for the removal of HCN from gaseous streams containing this impurity, the process comprising contacting or scrubbing the gaseous stream with a first composition or compound having the formula

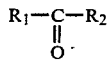

wherein $R_1$ and $R_2$ are hydrogen or alkyl containing 1 through 3 carbon atoms, provided that $R_1$ and $R_2$ are never simultaneously alkyl; precursors thereof; and mixtures of said compounds, precursors, and compounds and precursors; in an amount sufficient to remove at least the bulk of the HCN, and under conditions to convert HCN. A partially-purified gas stream having reduced HCN content is produced, the partially-purified stream is contacted with an effective amount of an ammonium or sodium polysulfide (or mixtures thereof) containing solution under conditions to convert HCN, and a purified gas stream with further reduced HCN content, and an ammonium or sodium thiocyanate (or a mixture thereof) containing solution, are produced. The purified gas stream may be recovered, used, or sent to further treatment, and at least a portion of the solution containing ammonium or sodium polysulfide, or mixtures thereof, and ammonium and/or sodium thiocyanate may be removed from the contacting zone, preferably on a continuous basis. In the case of ammonium thiocyanate containing solution, the solution may then be hydrolyzed, stripped for removal of gases, and finally biotreated in a nitrifying-denitrifying bacterial environment. The hydrolysis may be carried out under suitable conditions of temperature and pressure. The hydrolysis may be omitted; sodium hydroxide can be added to release ammonia for recycle and/or recovery, and the thiocyanate can then be destroyed by biotreatment alone. Biotreatment of this residual thiocyanate produces sodium sulfate in solution, and nitrogen and carbon dioxide gases which are released harmlessly. As indicated, the process is preferably operated continuously. The novel combination process of the invention provides an optimum balance of prevention of cyanide complex formation, corrosion protection, and effluent salt content adjustment.

DETAILED DESCRIPTION OF THE INVENTION

The reactions for the process may be shown, generally, as follows:

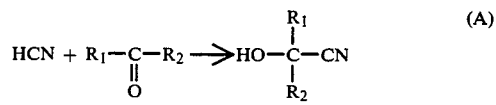

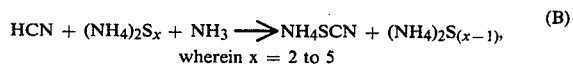

wherein x = 2 to 5 or

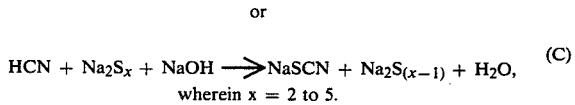

wherein x = 2 to 5.

If hydrolysis of the thiocyanate solution is employed, the reaction is, as follows:

The particular type of gas stream treated according to the invention is not critical, as will be evident to those skilled in the art. Any gaseous stream containing HCN and from which it is desired to remove the HCN, and whose other components do not react substantially with the first mentioned compositions employed, or with ammonium polysulfide, or interfere substantially therewith may be treated according to the invention. Gaseous streams or effluents particularly suited to the invention include fuel gases produced by gasification procedures, e.g., fuel or effluent gases derived from or produced by the gasification of coal, petroleum, shale, tar sands, etc., wherein a significant quantity of HCN is present. In such gasification processes, the gaseous effluents are often quenched with water or gaseous liquids, and gaseous streams derived from stripping the liquids may contain HCN and may also be treated by the invention. The HCN content of such streams may vary from trace amounts up to one percent by volume, but the invention will preferably be employed with streams having an HCN content of from about 0.002 percent to about 0.1 percent by volume.

The first step of process of the invention is preferably conducted on a continuous basis, i.e., the first composition is supplied continuously to the zone where it contacts the HCN-containing gaseous stream. The composition may simply be injected into the gaseous stream, or it may be added as part of a scrubbing solution or quenching solution. In any event, it will be added in such amount that the bulk of the HCN in the gas stream will be converted. Those skilled in the art may determine appropriate amounts of the composition, given the concentration of the HCN. In general, ratios of 0.6 mol to 2.0 mols of first composition to HCN will be employed, with ratios of 0.5 mol to 1.0 mol of first composition being preferred. It is not necessary that all of the first composition be reacted in the first step of the invention; provision being made for "carryover" of the first composition or even direct introduction into the second contacting step or zone.

The second contacting of the partially-purified gas, i.e., with the polysulfide solution, is also preferably carried out continuously. Thus, make-up sulfur and ammonium sulfide or ammonium polysulfide, or sodium polysulfide, or mixtures thereof, is continuously supplied to the second contacting zone, and a portion or "bleed" of ammonium, sodium, or mixed ammonium-sodium thiocyanate solution is continuously removed from the second contacting zone. Part or all of this bleed may be fed to the first contacting zone. The volumes of make-up and bleed will depend, inter alia, on the concentration of HCN remaining in the gaseous stream, and thus cannot be given with precision. Those skilled in the art may suitably adjust solution flows.

As noted, supra, the compositions first employed in contacting the HCN containing stream are compounds having the formula

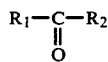

wherein $R_1$ and $R_2$ are hydrogen or alkyl containing from 1 through 3 carbon atoms, provided that $R_1$ and $R_2$ are never simultaneously alkyl; precursors thereof, and mixtures of said compounds, precursors, and compounds and precursors. As used herein, the term "precursors" refers to compositions which, under the conditions of the contacting, yield a compound or compounds of the formula given. The preferred composition is formaldehyde, or one or more of its precursors, such as paraformaldehyde. The compounds are preferably supplied as aqueous solutions, although other solvents may be employed.

Suitable conditions in the first contacting step, i.e., appropriate temperature, pressure, sufficient contact time, proper pH, and appropriate ratios of composition to HCN, are employed to achieve the conversion of HCN. Temperatures and pressures may vary widely, particularly if the first composition is employed as part of a quenching or scrubbing solution. Similarly, contact times and pH will depend on the streams contacted, and are subject to great variation. In general, those skilled in the art may adjust the process conditions to provide good HCN conversion. By way of example only, suitable temperatures may range from 70° C. to 340° C., preferably from 100° C. to 270° C., and suitable pressures will range from 100 psig. to 1000 psig., preferably from 300 psig. to 600 psig. Total contact times may vary from one second to three hundred seconds, or even longer, if the HCN content, upon contacting, is not adequately extinguished, and pH of the system may vary from 6 to 9.

Similarly, suitable conditions, i.e., appropriate temperature and pressure, sufficient contact time, proper pH, and appropriate concentrations of polysulfide in water are employed to achieve the conversion of the remaining HCN to ammonium or sodium thiocyanate. Temperatures in the polysulfide contacting step of from about 20° C. to about 120° C. may be employed, with temperatures of from 25° to 110° C. being preferred. The pH of the polysulfide solutions will range from about 6 to 10, preferably 7.0 to 9.0, and concentrations of ammonium or sodium polysulfide (or mixtures thereof) will preferably range from 0.001 to 1, preferably 0.01 to 0.05 gram moles per liter. If alkali (NaOH) is added to adjust pH, thosed skilled in the art will recognize that a mixture of polysulfides is present. The polysulfide solution will be supplied in an effective amount, i.e., an amount containing sufficient reactant polysulfide to reduce substantially the HCN content of the gas stream. Normally, the polysulfide solution will have at least a stoichiometric amount of the polysulfide sulfur with respect to the HCN, and preferably up to 3 or 4 times the stoichiometric amount. Elemental sulfur may be supplied in the contact zone to maintain this concentration. $H_2S$ and $NH_3$ in the feed gas do not interfere with HCN removal or conversion, and $NH_3$ may actually help rejuvenate the solution. The polysulfide solution may be supplied on a continuous basis to the contact zone as make-up, or steps can be taken, in some cases, to generate polysulfide to some extent in situ. Gas-liquid contact times may range from 0.1 to 1 minute, preferably 0.2 to 0.5 minute. Solution residence times in the contacting zone may vary from 10 minutes to 60 minutes, or even longer, if the HCN content, upon contacting, is not fully extinguished. Those skilled in the art may select suitable contact or scrubbing devices to carry out the contacting or scrubbing.

The products of the reaction between the HCN and the first composition are easily recovered and disposed of. For example, if the first composition is employed in a fly ash removal solution, the spent stream may first be stripped, and then sent to biotreatment. In the case of the polysulfide contacting step, solution containing ammonium thiocyanate may be sent to a hydrolysis zone where the ammonium thiocynate is hydrolyzed to produce $NH_3$, $H_2S$, and $CO_2$. Sufficient water must be present or supplied for the hydrolysis. Temperatures in the hydrolysis zone are important, and will range from about 200° C. to about 300° C. In general, pressures will range from about 20 to about 100 atmospheres. The $H_2S$, $NH_3$, and $CO_2$ produced from the hydrolysis may be recovered and recycled, or treated further, as desired. As will be recognized by those skilled in the art, provision may be made for recovery and suitable recycle of the sulfur for polysulfide make-up or concentration maintenance. The residual stream, after the ammonium thiocyanate hydrolysis, and after any sulfur separation, may be treated further or used in other plant operations, etc. Alternately, as mentioned, the hydrolysis step may be omitted; sodium hydroxide can be added to the solution to release ammonia in a stripping step, for recycle and recovery. Sodium thiocyanate containing solution can be destroyed by biotreatment, as noted.

ILLUSTRATION

In order to clarify the invention more fully, the following procedure is outlined. All values are merely exemplary or calculated.

A synthesis gas stream containing 2.7 percent $H_2$, 80 percent CO, 1.4 percent $H_2S$, 0.02 percent $NH_3$, and 0.02 percent HCN (all by weight), derived from a plant for the partial combustion of coal, and having a temperature of 1450° C., a pressure of 375 psig, and a flow rate of 110 g/sec. is passed, after initial cooling and separation of the bulk of flyash therein, into a wet contacting system for the removal of fine particulates. The gaseous stream is contacted, at a rate of 24 g/sec, with an aqueous 0.1 percent by weight solution of formaldehyde. The contacting removes fine particulates, and converts the bulk of the HCN in the synthesis gas stream. The contacting is carried out continuously, "spent" solution being removed and sent to further processing.

The synthesis gas stream, which now has a lowered HCN content but has slightly increased $NH_3$ content, is passed to a second contacting zone where it is scrubbed continuously with an approximately 0.01N solution of ammonium polysulfide. The pH of the solution is 8, and the temperature of the system is about 100° C. About 38 g/sec of polysulfide solution containing ammonium thiocyanate is removed from the system.

What is claimed is:

1. A process for removing HCN from a gaseous stream comprising
   (a) contacting said stream with a compound having the formula

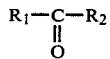

wherein $R_1$ and $R_2$ are hydrogen or alkyl containing 1 through 3 carbon atoms, provided that $R_1$ and $R_2$ are never simultaneously alkyl; precursors of said compounds; and mixtures of said compounds, precursors, and compounds and precursors, in an amount sufficient to remove at least the bulk of the HCN, under conditions to convert HCN, and producing a partially-purified gas stream having reduced HCN content;
   (b) contacting said partially-purified gas stream with an effective amount of an aqueous solution containing a reactant selected from ammonium polysulfide, sodium polysulfide, and a mixture of ammonium polysulfide and sodium polysulfide, under conditions to convert HCN, producing a purified gas stream with a further reduced HCN content.

2. The process of claim 1 wherein the compound is formaldehyde, and the compound is supplied in an aqueous solution.

3. The process of claim 2 wherein the reactant is ammonium polysulfide.

4. The process of claim 2 wherein the reactant is sodium polysulfide.

5. The process of claim 2 wherein the reactant is a mixture of ammonium polysulfide and sodium polysulfide.

6. The process of claim 3 wherein the gaseous stream is synthesis gas derived from the gasification of coal.

7. The process of claim 4 wherein the gaseous stream is synthesis gas derived from the gasification of coal.

8. The process of claim 5 wherein the gaseous stream is synthesis gas derived from the gasification of coal.

* * * * *